(12) United States Patent
Betting et al.

(10) Patent No.: US 7,318,849 B2
(45) Date of Patent: Jan. 15, 2008

(54) CYCLONIC FLUID SEPARATOR EQUIPPED WITH ADJUSTABLE VORTEX FINDER POSITION

(75) Inventors: Marco Betting, Rijswijk (NL); Cornelis Antonie Tjeenk Willink, Rijswijk (NL)

(73) Assignee: Shell Oil Company, Houston, TX (US)

( * ) Notice: Subject to any disclaimer, the term of this patent is extended or adjusted under 35 U.S.C. 154(b) by 590 days.

(21) Appl. No.: 10/512,748

(22) PCT Filed: Apr. 29, 2003

(86) PCT No.: PCT/EP03/04703

§ 371 (c)(1),
(2), (4) Date: Oct. 27, 2004

(87) PCT Pub. No.: WO03/092850

PCT Pub. Date: Nov. 13, 2003

(65) Prior Publication Data

US 2005/0172815 A1    Aug. 11, 2005

(30) Foreign Application Priority Data

Apr. 29, 2002   (EP)   .................................. 02076687

(51) Int. Cl.
*B01D 45/12* (2006.01)

(52) U.S. Cl. ............................ 55/396; 55/411; 55/412; 55/418; 55/447

(58) Field of Classification Search .................. 55/394, 55/396, 411, 412, 418, 447, 456; 95/32
See application file for complete search history.

(56) References Cited

U.S. PATENT DOCUMENTS 3,155,401 A    11/1964 Musolf (Continued)

FOREIGN PATENT DOCUMENTS

| DE | 2243926 | 3/1974 |
|---|---|---|
| DE | 10040015 | 2/2002 |
| EP | 0496128 | 7/1992 |
| EP | 0711903 | 5/1996 |
| EP | 1141520 | 5/2003 |
| GB | 1103130 | 2/1968 |
| GB | 2037610 | 7/1980 |
| JP | 63165849 | 7/1988 |
| JP | 2017921 | 1/1990 |
| JP | 02017921 | 1/1990 |
| NL | 8901841 | 2/1991 |
| RU | 593717 | 2/1978 |
| RU | 1172540 | 8/1985 |
| RU | 1768242 | 10/1992 |
| WO | WO9509970 | 4/1995 |
| WO | 99/01194 | 1/1999 |
| WO | WO0040835 | 7/2000 |
| WO | 01/21286 | 3/2001 |
| WO | WO0121286 | 3/2001 |

*Primary Examiner*—Robert A. Hopkins

(57) ABSTRACT

A cyclonic fluid separator for separating one or more condensable components, such as water, and/or solids, such as smoke or sand particles, from a fluid mixture has a tubular housing having a fluid inlet section in which the fluid mixture is accelerated to a supersonic velocity and thereby expanded and cooled such that condensable components condense and/or solidify, one or more wings for inducing the fluid mixture to swirl within a central section of the tubular housing, a fluid separation section in which a tubular vortex finder is movably arranged, a condensables enriched fluid outlet which is connected to an annular space surrounding the tapered tubular vortex finder and a condensables depleted fluid outlet which is connected to the interior of the tapered tubular vortex finder. The vortex finder may be movable in a radial and/or longitudinal direction within the housing to align the entrance of the vortex finder with the centre of rotation of the swirling fluid, which center of rotation may be unaligned to and/or spiral about the central axis of the tubular housing as a result of the radial fluid displacement by the wing(s).

4 Claims, 1 Drawing Sheet

U.S. PATENT DOCUMENTS

| | | | |
|---|---|---|---|
| 3,185,181 A | 5/1965 | Demyan | 138/37 |
| 3,297,344 A | 1/1967 | Hanes | |
| 3,493,050 A | 2/1970 | Kelley et al. | 166/267 |
| 3,544,170 A | 12/1970 | Bowles | 302/28 |
| 3,559,373 A | 2/1971 | Garrett | |
| 3,599,400 A | 8/1971 | Orleux | |
| 3,616,596 A | 11/1971 | Campargue | |
| 3,626,665 A | 12/1971 | Fenn et al. | |
| 3,720,263 A | 3/1973 | Murphy et al. | 166/303 |
| 3,725,271 A | 4/1973 | Giannotti | 210/65 |
| 3,892,070 A | 7/1975 | Bose | 60/279 |
| 3,894,851 A | 7/1975 | Gorman | |
| 3,997,008 A | 12/1976 | Kellner | |
| 4,102,401 A | 7/1978 | Erbstoesser | |
| 4,141,701 A | 2/1979 | Ewan et al. | |
| 4,148,735 A | 4/1979 | Laval, Jr. | |
| 4,194,718 A | 3/1980 | Baker et al. | |
| 4,272,499 A | 6/1981 | Cason et al. | 423/242 |
| 4,292,050 A | 9/1981 | Linhardt et al. | |
| 4,308,134 A | 12/1981 | Lilleker et al. | 209/211 |
| 4,531,584 A | 7/1985 | Ward | 166/265 |
| 4,541,845 A | 9/1985 | Michel-Kim | |
| 4,606,557 A | 8/1986 | Coffey | |
| 4,823,880 A | 4/1989 | Klatt | 166/373 |
| 4,898,235 A | 2/1990 | Enright | |
| 5,261,242 A | 11/1993 | Lardinois | 62/11 |
| 5,333,684 A | 8/1994 | Walter et al. | |
| 5,444,684 A | 8/1995 | Yanagi et al. | 369/44.28 |
| 5,682,759 A | 11/1997 | Hays | |
| 5,713,416 A | 2/1998 | Chatterji et al. | |
| 5,794,697 A | 8/1998 | Wolflick et al. | 166/265 |
| 6,222,083 B1 | 4/2001 | Colle | |
| 6,237,691 B1 | 5/2001 | Kelley et al. | |
| 6,280,502 B1 | 8/2001 | van Veen et al. | 95/29 |
| 6,372,019 B1 | 4/2002 | Alferov et al. | 95/29 |
| 6,447,574 B1 | 9/2002 | Frier, Jr. et al. | 95/29 |
| 6,513,345 B1 | 2/2003 | Betting et al. | |
| 6,524,368 B2 | 2/2003 | Betting et al. | 95/29 |
| 6,921,424 B2 * | 7/2005 | Bugli et al. | 55/385.3 |
| 6,962,199 B1 | 11/2005 | Willink | |
| 2002/0194988 A1 | 12/2002 | Betting et al. | 95/29 |
| 2003/0145724 A1 | 8/2003 | Betting et al. | 95/29 |

* cited by examiner

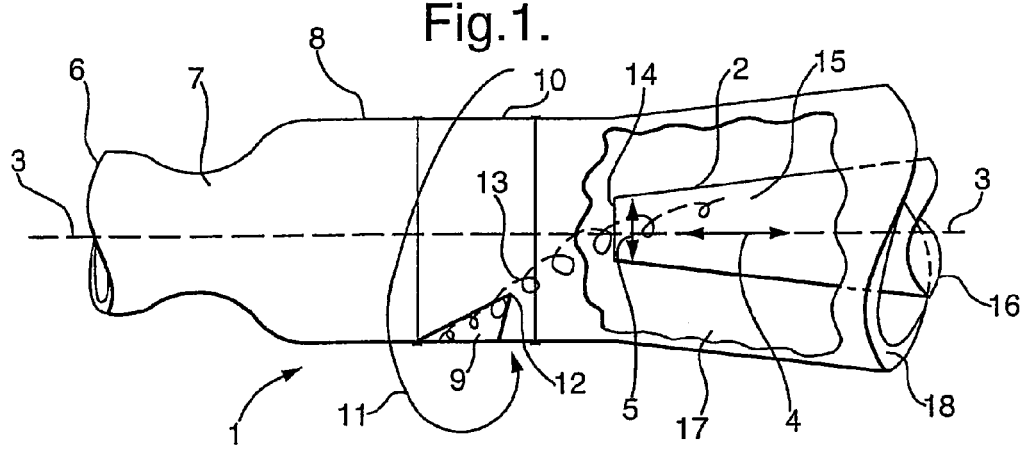
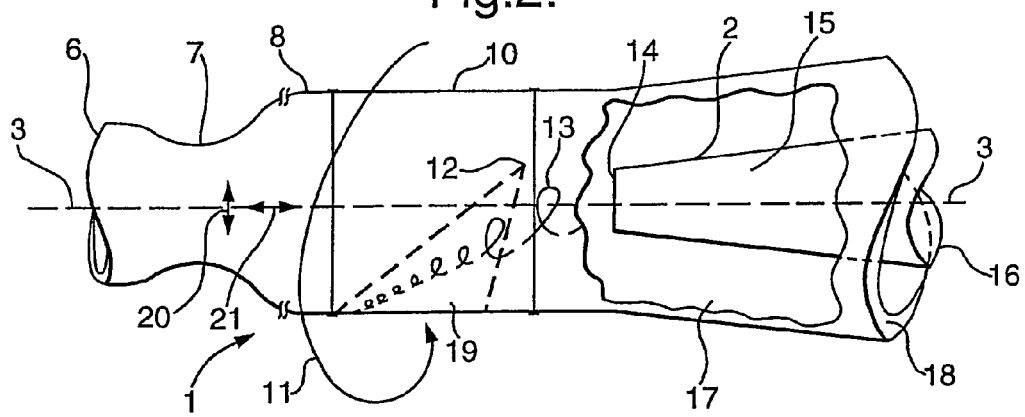
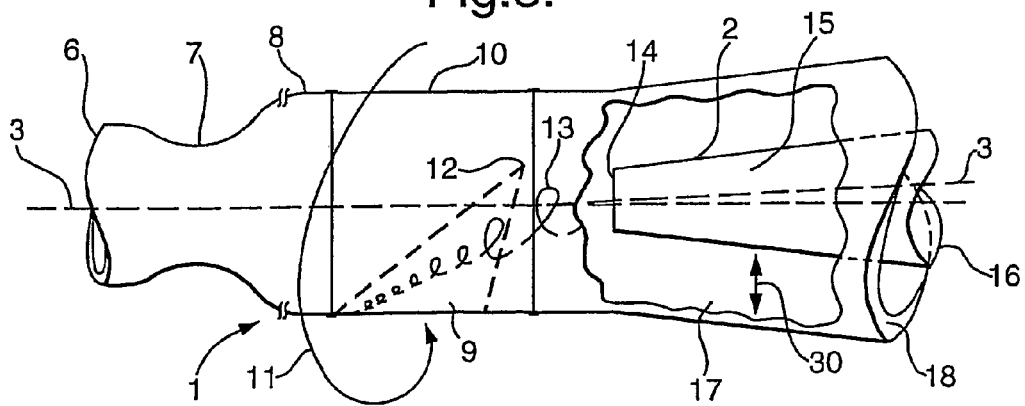

CYCLONIC FLUID SEPARATOR EQUIPPED WITH ADJUSTABLE VORTEX FINDER POSITION

The present application claims priority on European Patent Application 02076687.9 filed 29 Apr. 2002.

1. Field of the Invention

The invention relates to a cyclonic fluid separator, which is equipped with a vortex finder.

2. Background of the Invention

Such a fluid separator is known from European patent application 0496128 and from International patent application WO99/01194.

The cyclonic fluid separator known from these prior art references comprises a fluid inlet section comprising a nozzle in which the fluid mixture is accelerated to a supersonic velocity and thereby expanded and cooled to a temperature well below 0 degrees Celsius such that one or more condensable components, such as water and hydrocarbon condensates, condense and/or solidify. One or more wings induced the cooled fluid mixture to swirl around in a central section of the tubular separator housing as a supersonic cyclonic vortex whereby centrifugal forces create a condensables enriched fluid mixture at the outer circumference of the separator housing and a condensables depleted fluid mixture near a central axis of the separator housing. The swirling fluid mixture flows into a separation section in which a tubular vortex finder is concentrically arranged such that the condensables depleted fluid mixture flows into the tubular vortex finder and the condensables enriched fluid mixture flows into an annular space between the outer surface of the tubular vortex housing.

The known cyclonic fluid separators are able to separate a significant portion of condensable components from a fluid mixture and an object of the present invention is to further increase the separation efficiency of cyclonic fluid separators.

SUMMARY OF THE INVENTION

The cyclonic fluid separator according to the invention comprises a tubular housing, which has a fluid inlet section comprising a nozzle for accelerating the fluid mixture to a supersonic velocity to expand and cool the fluid mixture such that one or more condensable components are liquefied and/or solidified, one or more wings for inducing the cooled fluid mixture to swirl within a central section of the tubular housing, a separation section that is located downstream of the central section and in which a tubular vortex finder is arranged such that the vortex finder is movable relative to at least part of the tubular housing, a condensables enriched fluid outlet which is connected to an annular space between the outer surface of the tubular vortex finder and the inner surface of the tubular housing; and a condensables depleted fluid outlet which is connected to the interior of the tubular vortex finder.

It has been found that the centre of rotation of the vortex of swirling fluid is typically slightly eccentric relative to the central axis of the tubular separator housing and that the eccentricity is related to the position and size of the wings that induce the fluid to swirl within the housing.

The use of a movable vortex finder allows the positioning of the vortex finder concentric to the centre of rotation of the vortex of swirling fluid, which may be eccentric to the central axis of the tubular separator housing.

Suitably, the tubular vortex finder is movable in a radial and/or longitudinal direction relative to a central axis of the tubular housing.

Alternatively, the tubular housing is bendable such that the vortex finder is movable in a radial direction relative to the direction of the central axis of the inlet section of the tubular housing, which central axis is curved as a result of the bending of the tubular housing.

Preferably the wing or wings for inducing the fluid to swirl within a central section of the tubular housing are mounted on a carrier body which is co-axial and rotatable relative to a central axis of the central section of the tubular housing. The carrier body may be formed by a sleeve which forms part of the central section of the tubular housing and which is rotatable relative to other parts of the tubular housing.

The tubular vortex finder may be tapered such that the interior of the tubular vortex finder has a gradually increasing cross-sectional area in downstream direction.

BRIEF DESCRIPTION OF THE DRAWINGS

Preferred embodiments of the cyclonic separator according to the invention will be described in more detail with reference to the drawings in which:

FIG. 1 is a schematic longitudinal sectional view of a cyclonic separator according to the invention in which a vortex finder is movably arranged in the separator housing;

FIG. 2 is a schematic longitudinal sectional view of a cyclonic separator according to the invention in which the separator housing can be moved relative to the vortex finder; and FIG. 3 is a schematic longitudinal sectional view of a cyclonic separator in which the separator housing is bendable.

DETAILED DESCRIPTION OF THE EMBODIMENTS

Referring to FIG. 1 there is shown a cyclonic separator having a tubular housing 1 in which a tubular vortex finder 2 is movably arranged such that the vortex finder 2 can be moved relative to the central axis 3 of the tubular housing both in a longitudinal direction as illustrated by arrow 4 and in a radial direction as illustrated by arrow 5.

The separator further comprises a fluid inlet section 6 in which a laval type nozzle 7 is arranged in which the fluid mixture is accelerated to a supersonic velocity and thereby expanded and cooled to a temperature well below 0 degrees Celsius.

The cooled fluid then flows from the nozzle 7 at an ultrasonic velocity into a central section 8 of the housing in which a tilted wing 9 is arranged which is oriented at a selected angle relative to the plane of the drawing. The tilted wing 9 induces the fluid to swirl within the tubular housing 1. The tilted wing 9 is mounted on a sleeve 10, which forms part of the housing 1 and is rotatable relative to other parts of the housing as illustrated by arrow 11.

As a result of the volume of the wing 9 and the fluid turbulence adjacent to the wing 9 and wing tip 12 the fluid will typically swirl around a centre of rotation 13 which is eccentric relative to the central axis 3 of the tubular housing 1. The centre of rotation 13 of the vortex may swirl itself as a helix (not shown) relative to the central axis 3.

The arrangement of the wing 9 on a rotatable sleeve 10 and the movable arrangement of the vortex finder 2 within the housing 1 allows an accurate positioning of the vortex finder 2 such that the entrance 14 of the vortex finder 2 is concentric relative to the centre of rotation 13 of the vortex.

Experiments with the illustrated adjustable vortex finder 2 and rotatable wing 9 arrangement indicated that this arrangement increases the efficiency of the separation of condensables depleted and condensables enriched fluid more than 10%.

The adjustable vortex finder 2 and/or rotatable wing 9 may be controlled by automated position control systems which are connected to fluid composition and/or density sensors which detect the composition and/or density of the condensables depleted fluid flowing through the interior 15 of the tubular vortex finder 2 into a condensables depleted fluid outlet 16 at the downstream end of the vortex finder 2 and of the condensables enriched fluid which flows through an annular space 17 surrounding the vortex finder 2 into a condensables enriched fluid outlet 18.

In FIGS. 2 and 3 similar reference numerals are used to identify components that are similar to the components illustrated in and described with reference to FIG. 1.

In FIG. 2 the tubular housing 1 is radially and/or axially movable relative to a fixed vortex finder 2 as illustrated by arrows 20 and 21 in order to direct the centre of rotation 13 of the vortex induced by the wing 9 into the centre of the entrance 14 of the vortex finder 2.

In FIG. 3 the tail end of the tubular housing is bendable as illustrated by arrow 30 in order to direct the centre of rotation of the vortex induced by the wing into the centre of the entrance of the vortex finder 2.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A cyclonic fluid separator for separating one or more condensable components and/or solids from a fluid mixture, the separator comprising a tubular housing, which comprises:
   - a fluid inlet section comprising a nozzle for accelerating the fluid mixture to a supersonic velocity to expand and cool the fluid mixture such that one or more condensable components are liquefied and/or solidified;
   - one or more wings for inducing the cooled fluid mixture to swirl within a central section of the tubular housing;
   - a separation section, which is located downstream of the central section and in which a tubular vortex finder is arranged;
   - a condensables enriched fluid outlet which is connected to an annular space between the outer surface of the tubular vortex finder and the inner surface of the tubular housing; and,
   - a condensables depleted fluid outlet which is connected to the interior of the tubular vortex finder;
   - in which the tubular vortex finder is movable in a longitudinal and radial direction relative to a central axis of the tubular housing.

2. The cyclonic fluid separator of claim 1, wherein the tubular housing is bendable such that the vortex finder is movable in a radial direction relative to the direction of the central axis of the inlet section of the tubular housing which central axis is curved as a result of the bending of the tubular housing.

3. The cyclonic fluid separator claim 1, wherein one or more wings for inducing the fluid to swirl within a central section of the tubular housing are mounted on a carrier body which is co-axial and rotatable relative to a central axis of the central section of the tubular housing.

4. The cyclonic fluid separator of claim 1, wherein the tubular vortex finder is tapered such that the interior of the tubular vortex finder has a gradually increasing cross-sectional area in downstream direction.

* * * * *